H. H. SPONENBURG.
RAIL ANCHOR.
APPLICATION FILED MAY 29, 1916.
1,228,614.
Patented June 5, 1917.
5 SHEETS—SHEET 3.
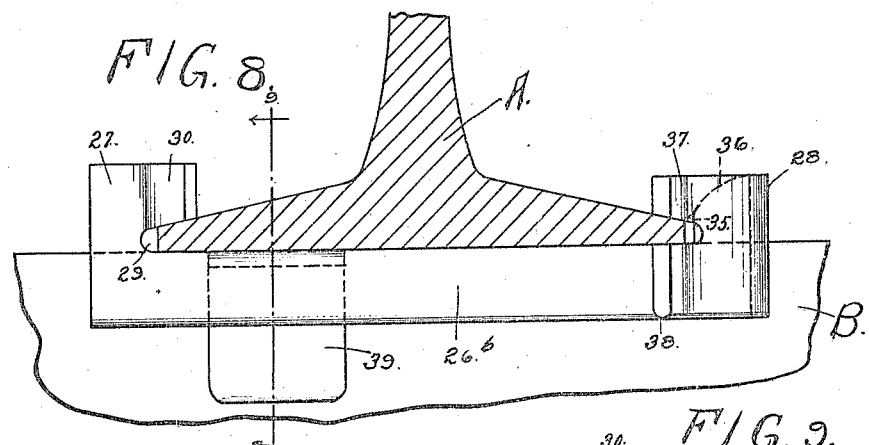
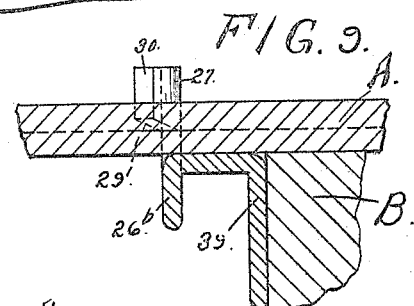
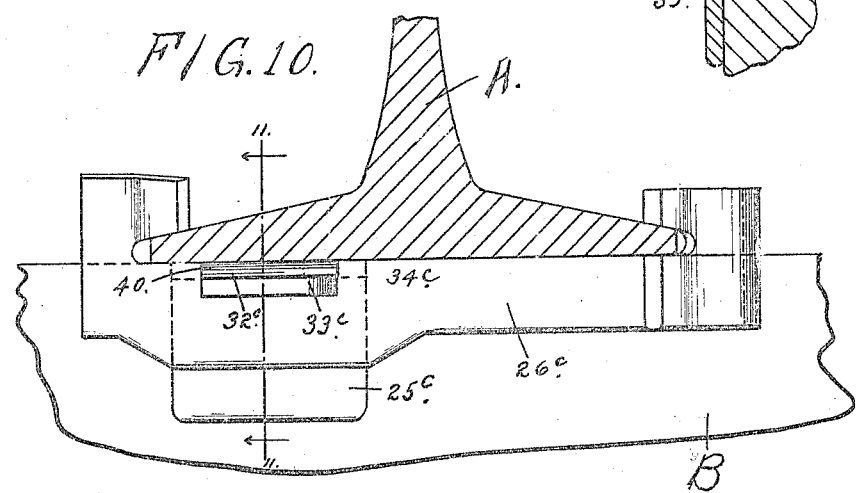
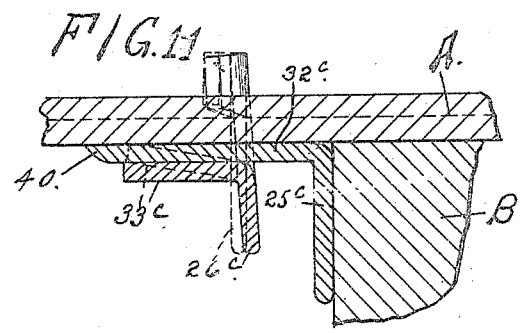
INVENTOR
Hiram H. Sponenburg
BY
Barnett & Turner
ATTORNEYS H. H. SPONENBURG.
RAIL ANCHOR.
APPLICATION FILED MAY 29, 1916.
1,228,614.
Patented June 5, 1917.
5 SHEETS—SHEET 5.
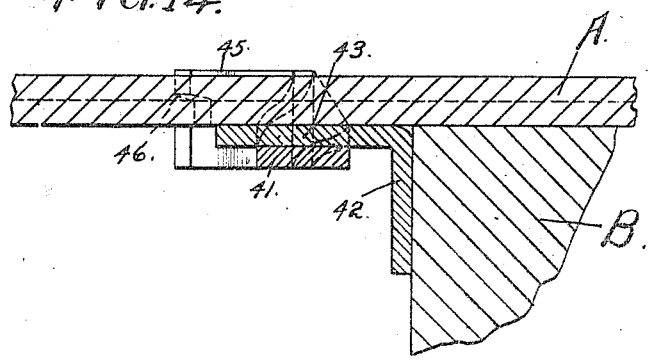
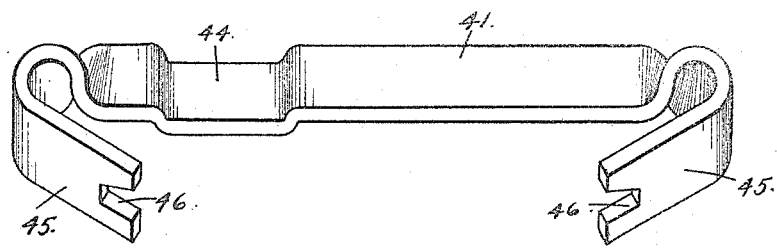
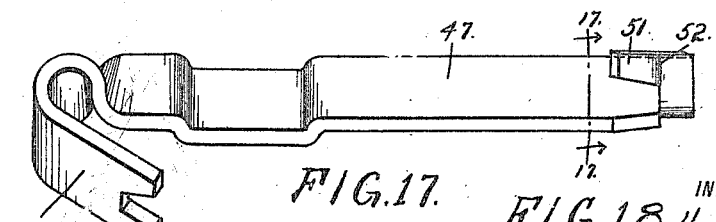
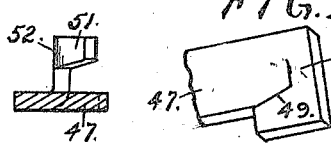
INVENTOR
Hiram H. Sponenburg
BY
ATTORNEYS

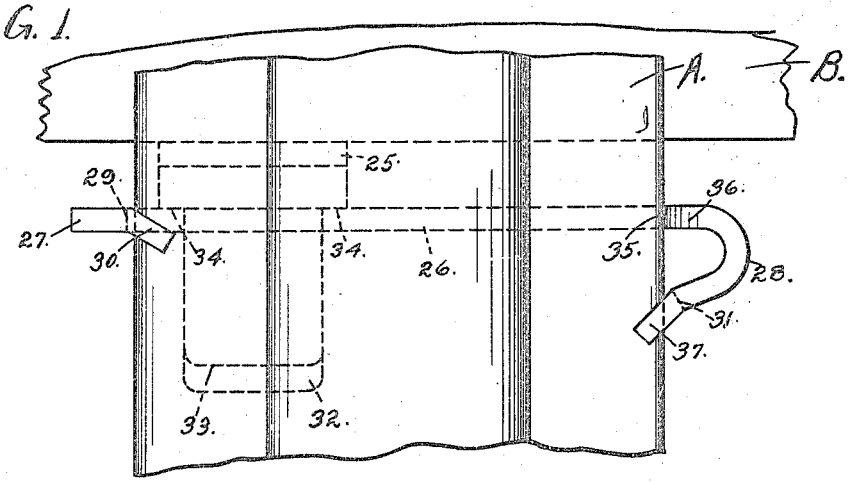
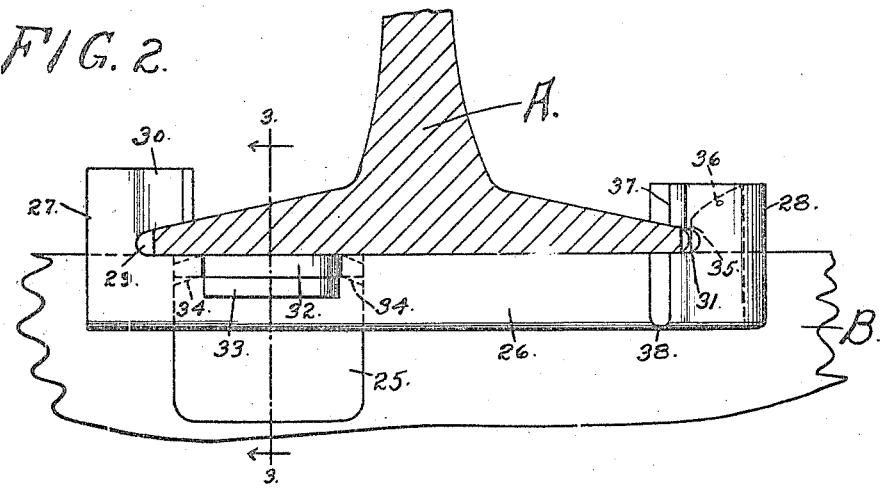
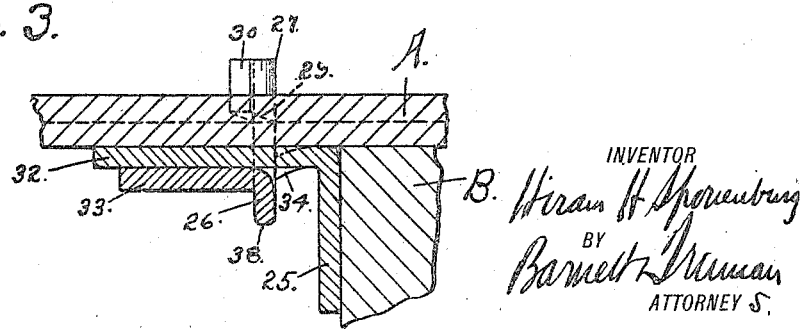

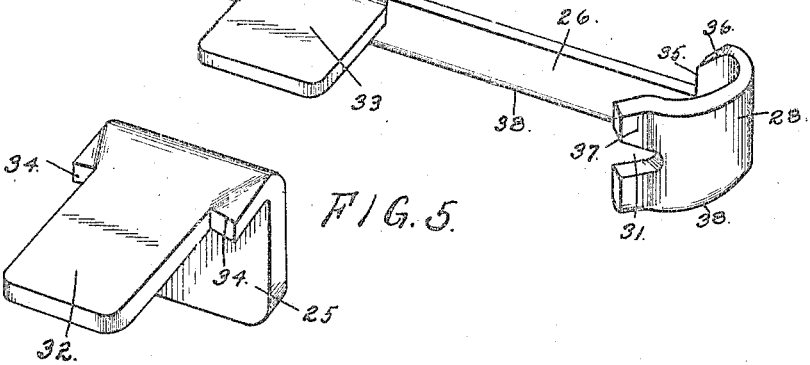
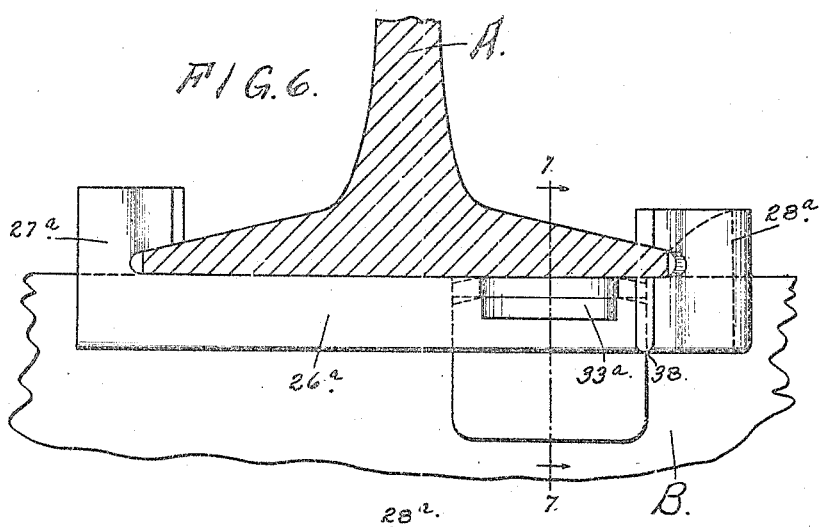
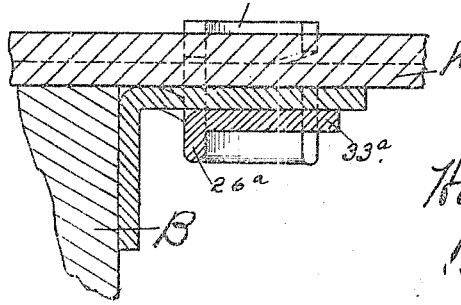

UNITED STATES PATENT OFFICE.

HIRAM H. SPONENBURG, OF GURNEE, ILLINOIS, ASSIGNOR, BY MESNE ASSIGNMENTS, TO OTTO R. BARNETT, OF CHICAGO, ILLINOIS.

RAIL-ANCHOR.

1,228,614.      Specification of Letters Patent.      Patented June 5, 1917.

Application filed May 29, 1916. Serial No. 100,454.

*To all whom it may concern:*

Be it known that I, HIRAM H. SPONENBURG, a citizen of the United States, residing at Gurnee, in the county of Lake and State of Illinois, have invented certain new and useful Improvements in Rail-Anchors, of which the following is a specification.

My invention relates to rail anchors, that is to say, to devices for preventing the longitudinal creep of railroad rails, and the object of the invention is to provide a rail anchor which will have certain features and combinations of features not possessed by any of the devices which have been heretofore devised for the purpose of checking the tendency of railroad rails to creep. The invention provides novel means for engaging a device with the rail of a character to withstand the various influences tending to loosen the hold of the device on the rail such, for example, as the vibration of the rail, contraction and expansion longitudinally brought about by temperature changes and the tendency of rails to re-act after the forward impulse has ceased.

A further object I have had in view was to provide a device, the hold of which would not be disturbed by interference with the ballast. When the ballast comes close up under the rail it is likely to freeze around the tie abutting flange or other projecting part of the device below the level of the rail base so that the contraction of the rail carrying the device backwardly away from the tie is likely to produce a loosening of the grip on the rail which destroys or lessens the effectiveness of the device. The invention provides certain constructions and arrangements which may be utilized either in a one-piece rail anchor or in a rail anchor consisting of more than one part.

Further objects of the invention, which will be referred to more particularly hereafter, are to provide certain constructions and arrangements whereby the rail anchor will be inexpensive to manufacture, light, strong and easily applied to and removed from the rail.

The invention is illustrated, in certain typical embodiments, in the accompanying drawings, it being understood that further modifications might be devised without departure from the principles of the invention as defined by the claims appended to this specification.

In the drawings,

Figure 1 is a plan view of one form of the invention, the device being shown as applied to a rail and abutted against one of the cross ties supporting said rail.

Fig. 2 is a side elevation of the anchor and tie, the rail being shown in section.

Fig. 3 is a sectional view on line 3—3 of Fig. 2.

Figs. 4 and 5 are views, in perspective, of the two parts of the anchor.

Fig. 6 is a view similar to Fig. 2 illustrating a modification.

Fig. 7 is a sectional view on line 7—7 of Fig. 6.

Fig. 8 is a side elevation of a one-piece rail anchor constructed in accordance with my invention.

Fig. 9 is a sectional view on line 9—9 of Fig. 8.

Figs. 10 and 11 are views, similar to Figs. 8 and 9, illustrating another modification.

Fig. 14 is a sectional view on line 14—14 of Fig. 13.

Fig. 15 shows, removed from the rail, the yoke member of the rail anchor illustrated in the three preceding figures.

Fig. 16 is a similar view illustrating another modification,

Fig. 17 is a detail sectional view on line 17—17 of Fig. 16.

Fig. 18 is a fragmentary view of one end of the blank from which the device is made before the jaw or lug is bent up from the body of the device.

Like characters of reference designate like parts in the several figures of the drawings.

Figure 12:
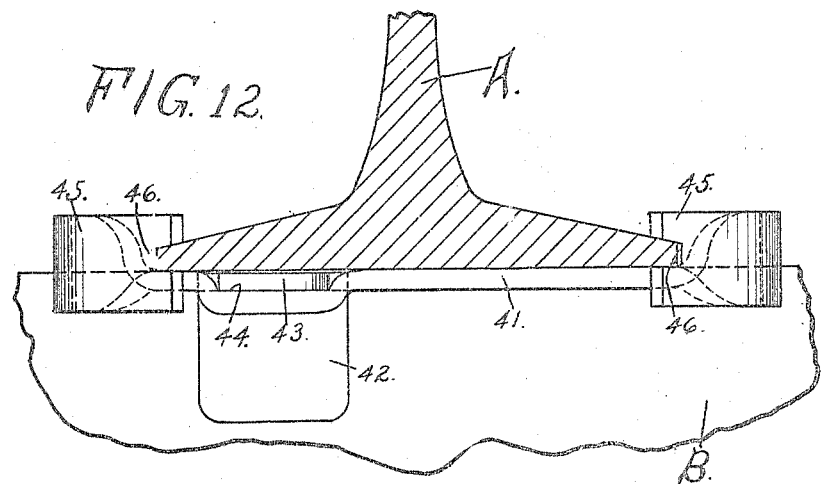
Fig. 12 is a side elevation of another modification.

In the drawings, the rail is shown at A and the cross tie against which the rail anchor abuts at B. It will be understood that while I shall refer to the rail anchor as abutting against a tie the device might be arranged to bear against any other member or part fixed in the roadbed.

Referring first to Figs. 1 to 5 inclusive, the typical embodiment of my invention therein shown consists of a tie abutting member 25 and a yoke member 26. The yoke member consists of a preferably flat bar of metal which is arranged edgewise under the base of the rail and is formed at one end with an enlargement 27 and at the other end with an enlargement 28. The enlargement 27 is formed with a notch or slot 29 to receive one edge of the base flange of the rail. The portion of the enlargement 27 which bears upon the top of the rail base is preferably bent backwardly away from the tie, as indicated at 30.

The hook or tongue 28 at the other end of the bar is curved backwardly away from the tie and is formed in its extremity with a notch 31 adapted to fit over the edge of the rail base. The member just described is preferably made of steel so as to have a certain amount of flexibility. The tie abutting member 25 is formed with a tongue 32. The bar 26 is formed with a rearwardly extending horizontal plate 33 on which tongue 32 rests, the plate 33 being below the level of the upper edge of the bar. The tongue is formed with shoulders 34 against which the bar 26 bears when the device is applied to the rail.

The application of the device to the rail is as follows: The tie abutting member is placed against the tie and the yoke member 26 is placed under the rail and with the notch 29 around one edge of the same. The enlargement 27 is then driven against one edge of the rail base far enough so that the vertical edge 35 of the hook or tongue 28 will clear the opposite edge of the rail base. This end of the device is then raised and at the same time the hook or spring tongue 28 is expanded or straightened out enough to allow the notch 31 to spring over the edge of the rail base. To facilitate the application of the device to the rail the hook or tongue 28 is preferably formed with a cam surface 36 which will come in contact with the lower corner of the rail base, when this end of the device is raised, if the enlargement 27 at the other end of the device has not been driven upon the rail far enough to allow the edge 35 to clear the edge of the rail base which it is intended to engage. The invention, in fact, contemplates having a close fit between the yoke member and the rail so as to insure a reliable hold of the device on the rail. When the device is in place it will be seen that the yoke member exerts spring pressure at both ends on the rail base. The hook 28 engages the rail elastically so as to bite into the same and check any longitudinal movement thereof either backwardly or forwardly. The edge 35 also engages the base flange of the rail and this engagement is intensified, causing the edge to bite into the rail as soon as the rail starts to creep. The lug 30 at the other end of the device, is bent a trifle from its normal set when the yoke is driven upon the rail. Any rocking of the anchor due to the fact that the hook end of the yoke is free from the tie increases the pressure of lug 30 on the upper surface of the base flange. The forces thus produced effectively check any tendency that the rail may have to creep. The hold of the device on the rail, as against any forward creep of the latter, is positive. The stronger the forward thrust is the tighter the device will bind between the enlargement or jaw member 27 and the edge 35. The spring tongue or hook 28 maintains at all times an initial grip of the device on the rail which is not affected by vibration or any such re-action as is thought to take place after the forward impulse ceases. Moreover, because of the fact that the initial hold of the device on the rail is effected by spring action, the device can be used on rails varying a trifle in the width of their base flanges. This is important as a certain amount of variation is found in the dimension of railroad rails due to the wearing of the rolls by which they are produced. While the device may be made in one or two pieces (a one-piece anchor will be described hereafter) the part which engages the rail consists of a single piece of metal, instead of two or more co-engaging parts (as in most rail anchors) which are likely to become disengaged or loosened, so as to destroy the initial grip essential to all rail anchors that operate by an arrangement through which the forward tendency of the rail is self checked. In my present invention the initial hold is insured by the elasticity of portions of a single integral member. Any forward creep of the rail is also checked at once by the wedging of the notched end of the tongue 28 on the upper and lower surfaces of the rail base. The extremity of the tongue 28 stands oblique to the rail, as best shown in Fig. 1, so that the tongue is compressed, causing its notched end to bite more deeply into the rail base. The notching of the tongue provides a lug 37 which bears obliquely on the sloping upper surface of the rail base in the same way that the oblique lug 30 bears on the side of the rail base. If the rail starts to creep it forces these lugs farther up on the sloping surfaces against which they bear which automatically increases their holding power.

In the form of device shown in Figs. 1 to 5 inclusive, the yoke 26 may move with respect to the tie abutting member 25 so that if the latter freezes into the ballast the contraction of the rail carrying the yoke member with it away from the tie does not operate to lessen the hold of the yoke on the rail. The yoke forms effectively a part of the rail and the tie abutting member effectively a part of the roadbed.

In order to lessen the danger of interference between the yoke member and the ballast the lower edge of the yoke member is preferably rounded, as indicated at 38.

The device shown in Figs. 6 and 7 is substantially the same as that shown in the preceding figures except that the tie abutting member is located at the other end of the bar. That is, the bar 26ª is formed with a supporting plate 33ª at the end adjacent the tongue or hook member 28ª instead of at the end provided with the enlargement 27ª. This change of the fulcrum from one end of the device to the other results in producing the cramping action between the jaw 27ª and the notched end of hook 28ª.

Figs. 8 and 9 show the application of the principles of my invention to a one-piece device. The bar 26ᵇ is formed integrally with a forward angular projection 39 which is adapted to bear against the tie. In other respects the device may be the same as that shown in Figs. 1 to 5 inclusive, and the corresponding parts are correspondingly numbered.

Figs. 10 and 11 show a two-part device in which additional binding force is produced by causing a backward tilting of the yoke member as a whole when the device is applied to the rail. The yoke member 26ᶜ is provided with a plate or tongue 33ᶜ standing at an obtuse angle to the bar. The yoke member is put onto the rail back of the tie abutting member 25ᶜ and is then driven forwardly toward the tie over the tongue 32ᶜ, the edge of the latter being preferably beveled, as shown at 40. If there is any looseness in the hold of the yoke on the rail it is taken up by the rocking of the yoke. Besides this the plate 33ᶜ is bent so that a constant spring pressure is created tending to keep the yoke in a slightly oblique position.

Figure 13:
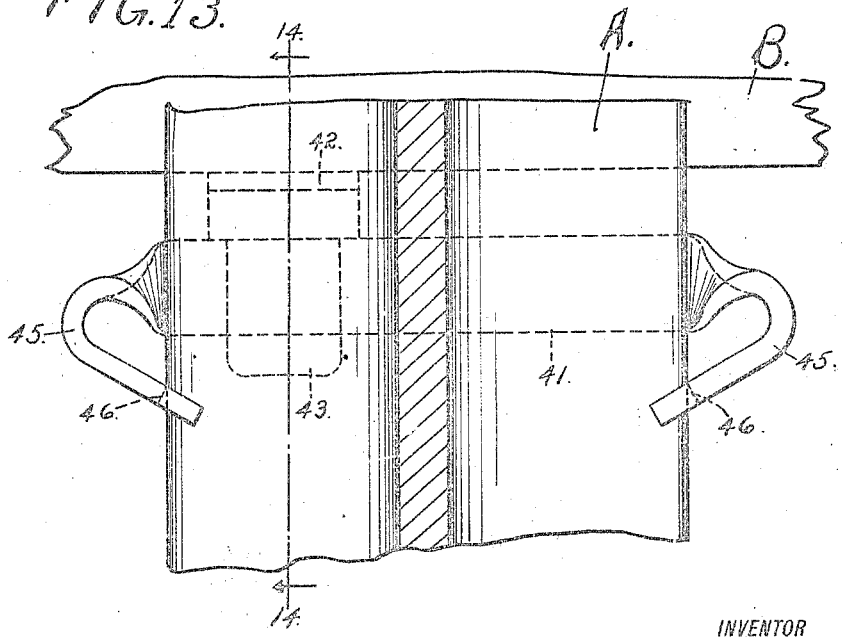
Fig. 13 is a plan view of the same.

In Figs. 12 to 15 inclusive, I have shown devices in which the bar 41 lies flatwise against the under surface of the rail. 42 is a tie abutting member having a tongue 43 lying in an off-set 44 in the bar 41. The bar is given a quarter turn at each end, providing two locking tongues 45, the ends of which are preferably notched at 46 for engagement with the opposite edges of the rail base.

A modified arrangement is shown in Figs. 16, 17 and 18. The bar 47 is formed at one end with a tongue 48, like the tongues 45 in the device previously described. The other end of the bar is severed along lines 49, 50 (Fig. 18) and bent up to provide a lug 51 which bears against the upper surface of the rail base, this lug being preferably bent, as indicated at 52, so that it stands obliquely to the length of the rail.

I claim:

1. A rail anchor comprising a bar of spring metal adapted to extend under the base of a rail and formed at one end so as to provide an edge to bear against the edge of the rail base and with a tongue extending backwardly away from said bar and the tie against which the device is abutted, the extremity of which is adapted to exert spring pressure against the rail.

2. A rail anchor comprising a bar of spring metal adapted to extend under the base of a rail and formed at one end so as to provide an edge to bear against the edge of the rail base and with a tongue extending backwardly away from said bar and the tie against which the device is abutted, the extremity of which is adapted to exert spring pressure against the rail and is notched for engagement with said rail base.

3. A rail anchor provided with a tie abutting member and comprising a bar of spring metal adapted to extend under the base of a rail and formed at one end with a tongue extending backwardly away from the tie against which the device abuts and adapted to exert spring pressure against the edge of the rail base.

4. A rail anchor provided with a tie abutting member and comprising a bar of spring metal adapted to extend under the base of a rail and formed at one end to provide an edge adapted to bear against the edge of the rail base, and with a tongue extending backwardly from said edge away from the tie against which said device abuts and adapted to exert spring pressure against the edge of the rail base.

5. A rail anchor provided with a tie abutting member and comprising a bar of spring metal adapted to extend under the base of a rail and formed at one end to provide an edge adapted to bear against the edge of the rail base, and with a tongue extending backwardly from said edge away from the tie against which said device abuts and adapted to exert spring pressure against the edge of the rail base, the extremity of the tongue being notched for engagement with said rail base.

6. A rail anchor comprising a flat bar of spring metal adapted to extend under the base flange of a rail and to engage the rail on one side thereof, the other extremity of said bar being formed with a tongue extending backwardly from the bar and the tie against which the device is abutted and adapted to engage the edge of the rail base at two points lengthwise thereof, said tongue being notched at its extremity for engagement with the rail base.

7. A rail anchor comprising a flat bar of spring metal adapted to extend under the base flange of a rail and to engage the rail on one side thereof, the other extremity of said bar being formed with a tongue extending backwardly from the bar and the tie against which the device is abutted and adapted to engage and exert spring pressure against the other side of the rail, said tongue being notched at its extremity for engagement with the rail base.

8. A rail anchor comprising a flat bar of spring metal adapted to extend under the base flange of a rail and to engage the rail on one side thereof, the other extremity of said bar being formed with an enlargement which stands edgewise with respect to the rail and is provided with a flexible tongue extending backwardly from the bar and the tie against which the device is abutted and bearing against the edge of the rail base.

9. A rail anchor comprising a flat bar of spring metal adapted to extend under the base flange of a rail and to engage the rail on one side thereof, the other extremity of said bar being formed with an enlargement which stands edgewise with respect to the rail and is provided with a flexible tongue notched for engagement with said rail base, and with an edge to bear against the rail base at a point between the notched end of the tongue and the tie against which the device abuts.

10. A rail anchor provided with a tie abutting member and comprising a flat bar of spring metal adapted to extend under the base of a rail and to engage the rail on one side thereof, the other extremity of the bar being formed with an enlargement which stands edgewise with respect to the rail base and is recessed to provide a jaw to receive the edge of said rail base, the portion of the enlargement above the rail base being bent backwardly away from the tie against which the device abuts.

11. A rail anchor comprising a flat bar of spring metal adapted to extend under the base of a rail, the extremities of which lie edgewise with respect to the rail base, one being recessed to form a jaw to engage the edge of the rail base and the other being formed so as to provide a biting edge to engage the opposite side of the rail base, and with a spring tongue extending backwardly from said biting edge.

12. A rail anchor comprising a flat bar of spring metal adapted to extend under the base of a rail, the extremities of which lie edgewise with respect to the rail base, one being recessed to form a jaw to engage the edge of the rail base and the other being formed so as to provide a biting edge to engage the opposite side of the rail base, and with a spring tongue extending backwardly from said biting edge which is notched at its extremity for engagement with the rail base.

13. A rail anchor comprising a bar of metal formed at one end with a jaw to engage a rail on one side thereof and at the other end with a curved, flexible tongue extending backwardly from the bar adapted to bear with spring pressure against the rail.

14. A rail anchor comprising a bar of metal formed at one end with a jaw to engage a rail on one side thereof and at the other end with a curved, flexible tongue extending backwardly from the bar adapted to bear with spring pressure against the rail, the end of which is notched for engagement with the rail base.

15. A rail anchor provided with tie abutting means and comprising a bar adapted to extend under the base of a rail, formed at opposite ends with rail engaging means, said means comprising spring lugs adapted to bear on the upper surfaces of the rail base on opposite sides of the rail, said lugs extending from said bar inwardly toward the rail and backwardly away from the tie against which the device abuts.

16. A rail anchor comprising an integral member extending under and engaging both sides of a rail and formed at one end with a backwardly extending spring locking tongue the free end of which engages the edge of the base flange of the rail.

17. A rail anchor comprising an integral member extending under and engaging both sides of a rail and formed at one end with a backwardly extending spring locking tongue the free end of which is notched for engagement with the rail base.

18. An anti-creeper provided at each end with rail engaging means, the means at one end comprising a backwardly extending flexible locking tongue to engage the edge of the base flange of the rail which is expanded when the device is applied to a rail so that when the device is in place it bears with spring action against the rail.

19. A rail anchor comprising a flat bar of steel adapted to extend under the rail edgewise thereof and formed at one end with a notched enlargement, at the other end with a spring locking tongue, and between its ends with a rearwardly extending plate; and an angular tie abutting member having a flange adapted to bear against the tie, and a tongue which extends between said plate and the base of the rail.

20. A rail anchor comprising a flat bar of steel adapted to extend under the rail edgewise thereof and formed at one end with a notched enlargement, at the other end with a spring locking tongue, and between its ends with a rearwardly extending plate; and an angular tie abutting member having a flange adapted to bear against the tie, and a tongue which extends between said plate and the base of the rail, said plate having a set upwardly toward the rail so that it is strained when the device is applied to the rail.

21. In a rail anchor the combination of rail clamping means comprising a flexible member provided with a projecting web and a tie abutting member, a part of which intervenes between the rail and said projecting web and subjects said flexible member to a bending strain.

22. In a rail anchor the combination of rail clamping means comprising a flexible member provided with a projecting web adapted to lie under the base flange of the rail and a tie abutting member, a part of which intervenes between the under surface of the base flange of the rail and said projecting web so as to subject said flexible member to a bending strain.

23. In a rail anchor the combination of a flat bar of steel arranged edgewise under the base flange of the rail provided with rail engaging means at opposite ends and with a plate which is disposed at an oblique angle to the bar and lies beneath said base flange, and a tie abutting member having a tongue which intervenes between said plate and the base flange of the rail and subjects said bar to a bending strain.

24. A rail anchor comprising a rail clamping member and a tie abutting member which are provided with projecting webs adapted to lie one upon the other, one of said members being flexible and its projecting web having an angular relationship thereto, whereby said member is subjected to a bending strain when the anchor is applied to a rail.

25. A rail anchor comprising a rail clamping member and a tie abutting member which are provided with projecting webs adapted to lie one upon the other, one of said members being flexible and its projecting web having an angular relationship thereto, whereby said member is subjected to a bending strain when the anchor is applied to the rail, but which will permit the rail clamping member to move relatively to the tie abutting member with the longitudinal movement of the rail when applied thereto.

HIRAM H. SPONENBURG.